July 9, 1957     W. F. BROWN, JR     2,798,666
ELECTRICAL ANALOGS
Filed Dec. 8, 1955     3 Sheets-Sheet 1

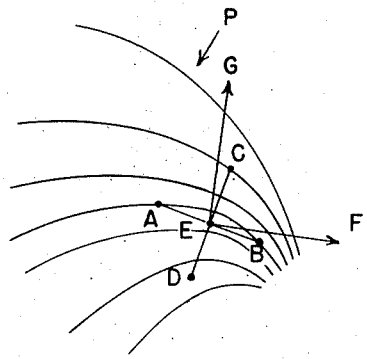

FIG. 1.

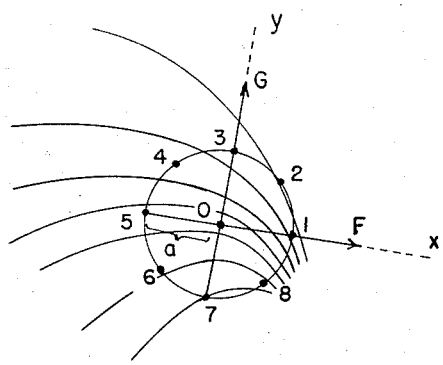

FIG. 2.

$$\left.\frac{\partial \phi}{\partial x}\right]_0 = \frac{1}{4a}\left\{(\phi_1-\phi_5) + \frac{1}{\sqrt{2}}\left[(\phi_2-\phi_4) + (\phi_8-\phi_6)\right]\right\}$$

$$\left.\frac{\partial \phi}{\partial y}\right]_0 = \frac{1}{4a}\left\{(\phi_3-\phi_7) + \frac{1}{\sqrt{2}}\left[(\phi_4-\phi_6) + (\phi_2-\phi_8)\right]\right\}$$

FIG. 3.

$$\left.\frac{\partial \phi}{\partial x}\right]_0 = \frac{2}{na}\sum_{k=1}^{n} \cos\theta_k \cdot \phi_k$$

$$\left.\frac{\partial \phi}{\partial y}\right]_0 = \frac{2}{na}\sum_{k=1}^{n} \sin\theta_k \cdot \phi_k$$

$$\theta_k = (K-1)\frac{2\pi}{n}$$

FIG. 4.

*INVENTOR.*
WILLIAM F. BROWN, Jr.
BY
*ATTORNEYS*

INVENTOR.
WILLIAM F. BROWN, Jr.

INVENTOR.
WILLIAM F. BROWN, Jr.

United States Patent Office 2,798,666
Patented July 9, 1957

2,798,666

ELECTRICAL ANALOGS

William F. Brown, Jr., Ridley Park, Pa., assignor to Sun Oil Company, Philadelphia, Pa., a corporation of New Jersey Application December 8, 1953, Serial No. 396,913

11 Claims. (Cl. 235—61)

This invention relates to electrical analogs and has particular reference to configurations of electrodes involved in the exploration of potential fields.

The application of Edward W. Yetter, Ser. No. 308,583, filed September 9, 1952, discloses an electrical analog involved in a reservoir analyzer which makes use of exploring probe electrodes movable in a conductor in which electrical current flows to provide an analog of an oil or gas reservoir. Reference to said application will reveal the practical requirement of exploring an electric current field, provided, conveniently, in a conducting electrolyte, by means of probes which determine potentials in the field, the location of equipotential lines in the field, and approximately measure and indicate the direction of gradients therein.

As disclosed in said application, there has been used an array of five probe electrodes for picking up potentials in the field for measurement and control. This arrangement of electrodes has involved a central electrode, representative, in effect, of the point at which measurements are to be made or referred, which central electrode has been utilized for determining the potential at a point of the field and to take part in the exercise of control for movement of the electrode array to a position centered at a point of particular predetermined potential. On an axis through this central electrode there were located, symmetrically spaced on opposite sides thereof, a pair of electrodes which may conveniently be termed equipotential electrodes. In the operation of the apparatus, these electrodes were automatically positioned so that both would lie upon a common equipotential of the field. On an axis at right angles to the axis just mentioned there were positioned two additional electrodes equally spaced from the center electrode which may be referred to as gradient electrodes. Measurements made between these electrodes gave an approximate value for the gradient of the field at the center point of the array when the equipotential electrodes were arranged on an equipotential.

Various deficiencies of such an electrode configuration exist. It is evident that the spread of the electrodes may not be too great because it may be readily seen that if the equipotentials have varying radii along their individual lengths, the line joining the equipotential electrodes cannot be regarded as tangent to a different equipotential at the center of the array. Likewise, if the gradient of the field at any location changes rapidly, the measurement of potential between the gradient electrodes will depart substantially from being proportional to the actual gradient existing at the central point of the array. On the other hand, the electrodes cannot be very close together. The differences of potential utilized for measurement will become too small for sensitivity if the electrodes are close together and, furthermore, the minimum practical cross-sections of the electrodes themselves will seriously affect the results if too close spacing of the electrodes is used.

It is the general object of the present invention to improve the pickup of potentials by electrode arrays so as to secure substantially improved accuracy of the measurements despite acceptance of practical electrode spacings suitable for giving potential differences of sufficient magnitude for accurate measurement. The attainment of this and other objects of the invention will become clear in the detailed discussion hereafter, but it may at this point be pointed out that in accordance with the invention the electrodes of the probe array are not caused to align themselves on equipotentials, the direction of a gradient is not assumed to be normal to the central point of a chord between points of an equipotential, nor is the measurement of the gradient dependent upon the assumption of linear variation of potential between gradient electrodes or probes so that it is represented by a potential between such probes divided by their spacing. In contrast with what has just been mentioned and has been characteristic of the prior art, potentials picked up by the probe electrodes are combined mathematically by electrical apparatus and the combined potentials are used to give rise to functions which are more accurately definitive of gradients and useable for determining in the apparatus the directions of gradients.

Reference may be made to the application of George A. Smith, Ser. No. 389,131, filed October 29, 1953, for disclosure of improved electrode arrays providing the objectives mentioned above. The present invention provides arrays having more desirable characteristics as will appear hereafter.

For a detailed understanding of the invention, reference may be made to the accompanying drawings, in which:

Figure 1 is a diagram illustrating for explanatory purposes the characteristics of probe operation as carried out in the prior art;

Figure 2 is a similar diagram but showing the arrangement and characteristics of operation of probes in accordance with the present invention;

Figure 5:
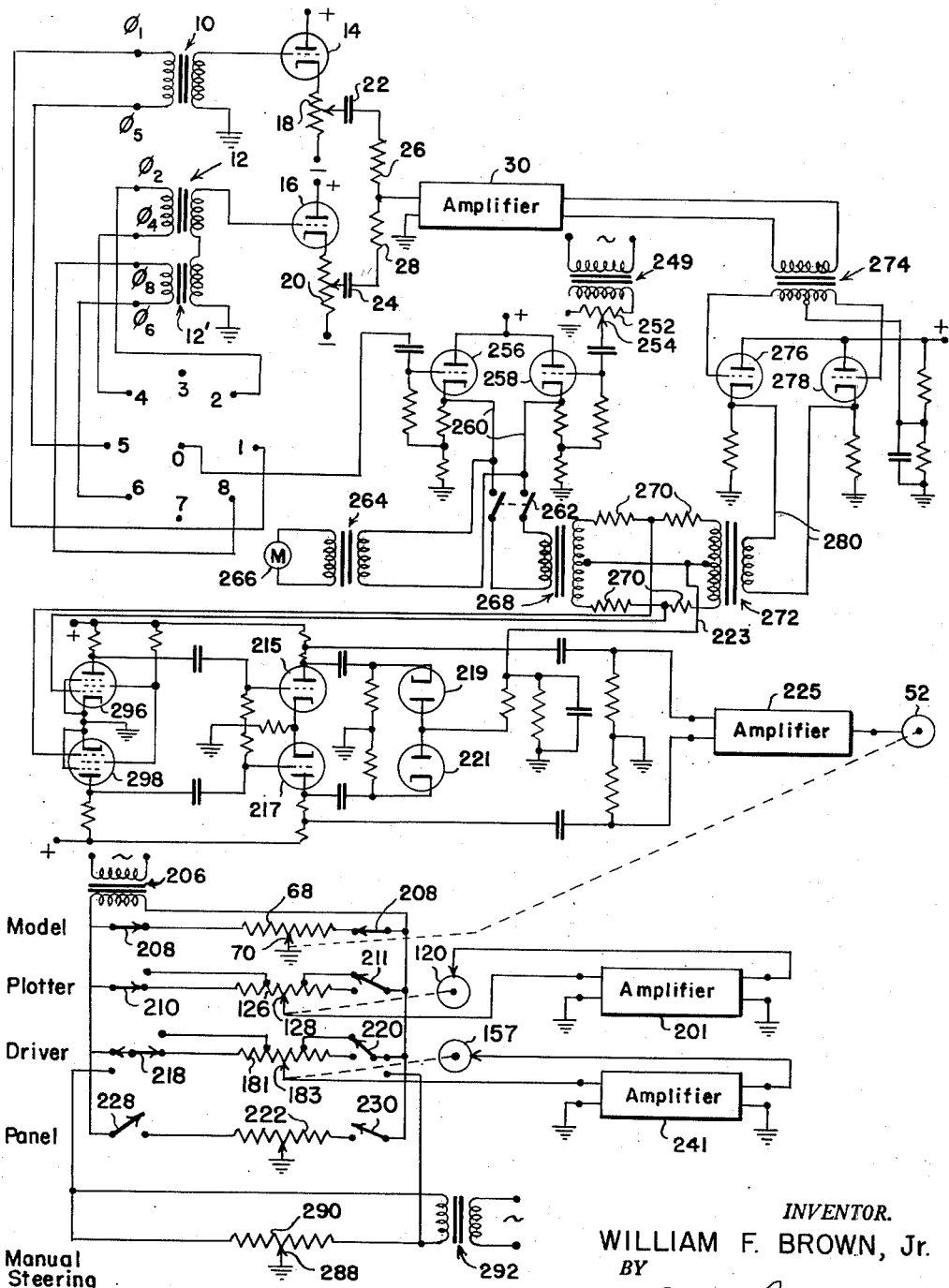
Figure 6:
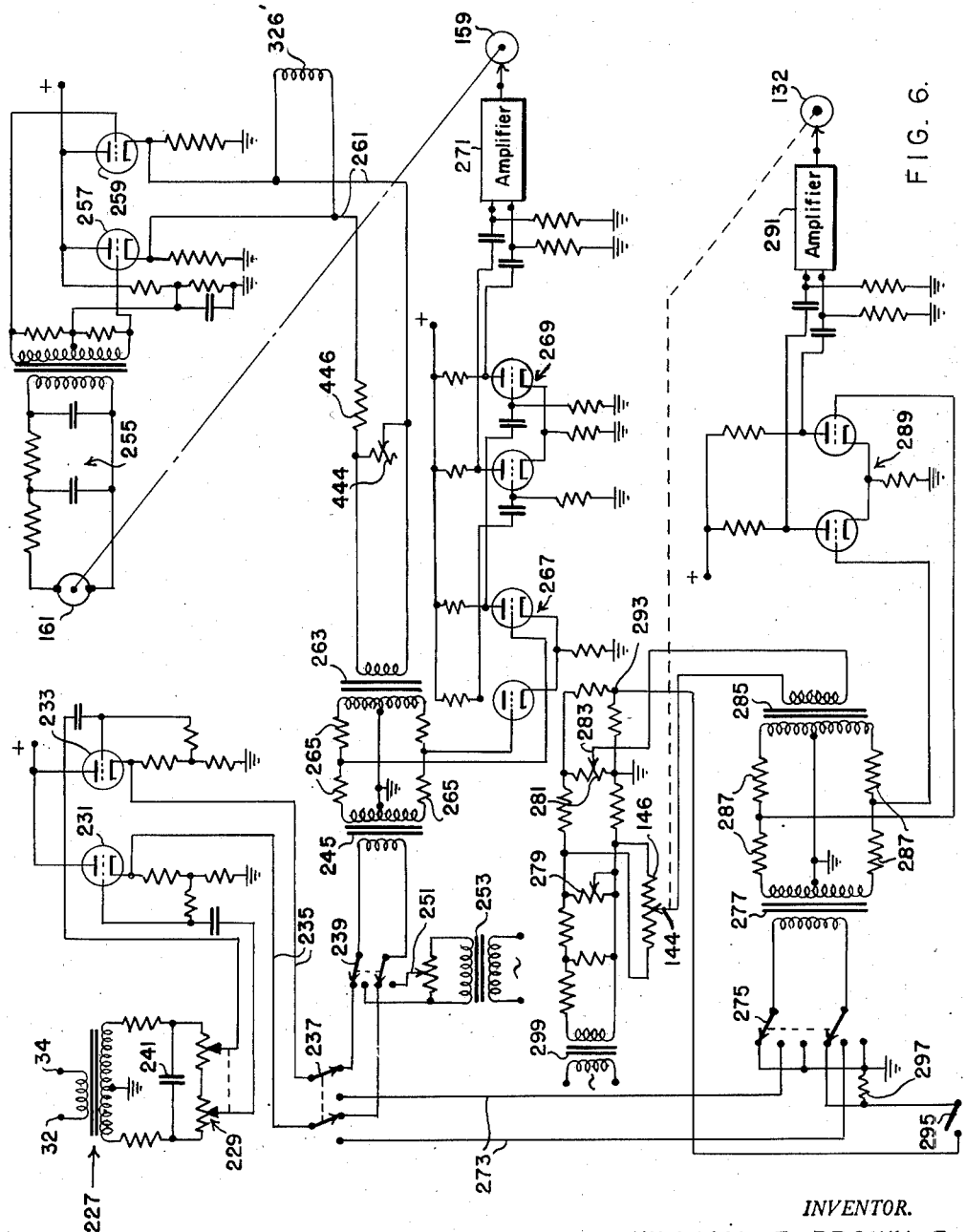

Figure 3 consists of equations for potential gradients applicable to the electrode configuration shown in Figure 2;

Figure 4 consists of equations for potential gradients applicable in general to electrode configurations of the type shown in Figure 2;

Figure 5 is a wiring diagram showing the electrical devices involved in establishing corresponding angular positions of the probe assembly in Figure 2 with stylus and driver mechanisms; and Figure 6 is a wiring diagram showing particularly devices specially controlled in measurements and plotting of matters involving gradients.

Referring first to Figure 1, the curved lines therein may be considered to represent equipotential lines existing in a two-dimensional electrical field such as is effectively presented for exploration by the type of analog disclosed in said Yetter application. In a shallow electrolyte tank such as disclosed in the Yetter application the potentials may be assumed not to vary substantially in depth. The equipotentials of fields which are of interest depart very substantially from a condition of being concentric arcs which for uniform potential variations are equally spaced. Instead, the equipotentials have along their lengths very substantial variations in curvature and in spacings for equal potential steps. Such variations are particularly involved at electrical sources and sinks in the analog provided by conducting electrodes simulating wells. As such points the flow lines converge and if several of such sources or sinks are adjacent to each other, the equipotentials depart greatly from circular arcs and gradients in the field are highly variable in both magnitude and direction. A typical probe electrode configuration such as used in the prior art is illustrated in Figure 1 as consisting of the conductors A, B, C, D and E arranged in cross formation, as shown in that figure, these probe electrodes being carried by a support capable of maintaining them in fixed relationship to each other and of both rotating and traversing the array. The center electrode E represents the "center" of the system corresponding to the point at which measurements are desired. The electrode E is commonly used for the detection of the potential at a desired point. Assuming electrodes A and B to be the equipotential electrodes, then in accordance with prior practice these electrodes are caused to assume positions on the same equipotential as illustrated. The axis of the electrodes C and D is perpendicular to that of the electrodes A and B and, in accordance with prior practice, the gradient at the center point of the array would be assumed to be measurable as the potential difference between electrodes C and D divided by their spacing when the electrodes A and B were aligned on the same equipotential.

It will be evident that if the field involved an arrangement of equipotentials as illustrated in Figure 1, the following conditions would exist:

The probe electrode E is not on the equipotential on which the electrodes A and B are aligned. Unless the last named equipotential and adjacent potentials were concentric circles, it will be evident that the line joining A and B would not be tangent to the equipotential through E. In the figure the vector F may be considered to be tangent to the equipotential through E at the location of E. It will be noted that the vector F deviates very considerably from the line joining A and B. The vector G perpendicular to F represents the direction of the gradient. It will be noted that this correspondingly deviates from the line joining C and D. It will be evident, furthermore, that if the gradient was assumed to be the difference of potential between electrodes C and D divided by the spacing between them, a considerable error would arise in view of the non-uniformity of spacing between the equipotentials as well as because of the making of the measurement along a line deviating angularly from the true direction of the gradient. In brief, accurate determinations of the magnitude and direction of the gradient of the field could not be made except in the case of a field for which the equipotentials were concentric circles and the gradient was uniform.

In accordance with the present invention the approach to the determination of the direction of the gradient and the measurement of the gradient is radically different from the approach represented by the prior art. While the mathematical theory may be expressed in various fashions, all leading to the same results, reference may be made to an approach utilizing Maclaurin's theorem. According to Maclaurin's theorem, a function of two variables at any point may be expressed in terms of the values of the successive partial derivatives of the variable at an origin point and the coordinates of the point in question. Of the derivatives at the origin point, the first derivatives with respect to the independent variables represent, if the function is a potential, the components of the gradient of the potential in the directions of the respective coordinate axes. By combining the expressions for the potentials at a suitable number of points and terminating the Maclaurin's series at terms of a particular order, algebraic expressions may be found for the components of the gradient at the origin, and these expressions will be accurate to the extent of retention of terms in the Maclaurin's series. Considering what has just been stated, the theoretical approach involved in the present invention will be clear: an array of electrodes is provided and potentials are measured at these electrodes. The potentials thus measured are combined in accordance with expressions hereafter indicated, and values for the gradient components with respect to axes associated with the electrode assembly are thus determined. If the electrode array is rotated so as to cause the combination of potentials measuring the gradient along one axis to vanish, then it follows that this axis will be in the direction of zero gradient, i. e. tangent to the equipotential at the origin. At the same time, the other axis will be perpendicular to this equipotential and in the direction of the gradient of the potential field so that the combined function of the measured potentials will represent a measurement of the gradient at the origin. The determined gradient direction and magnitude of the gradient thus secured are, of course, approximate to the extent that approximation may be achieved by making potential measurements with a limited number of electrodes, that is to say, mathematically, subject to disregard of certain higher order terms of the Maclaurin's series.

In the present invention, advantage is taken of additional relations that hold for a two-dimensional potential field such as is approximated in a shallow electrolytic tank of the type indicated for which the two-dimensional Laplace's equation may be assumed valid.

A particular array of probe electrodes which may be utilized is illustrated in Figure 2 in which the electrodes numbered 0 to 8, inclusive, are shown superimposed on the same potential field as is illustrated in Figure 1. The electrodes 1 to 8, inclusive, are equally spaced on the circumference of a circle of radius $a$ having its center at the position of electrode 0. Assuming $x$ and $y$ axes, as in Figure 2, with the probe O at the origin, the expressions for the $x$ and $y$ components of the gradient at the origin O, designated by the subscript O, are given by the respective right-hand expressions in Figure 3 in terms of the potentials measured at the electrodes designated by $\phi$'s to which are appended subscripts corresponding to the numbers of the electrodes. (It may be noted here and in the matter that follows that differences of potentials are alone of interest; values refered to a fixed reference are not involved.)

Assume, now, that the electrode assembly is rotated to give a zero value for the first expression in Figure 3, i. e. the $x$ component of the gradient of the potential. When this end has been achieved, the $x$ axis will be in the direction of the vector F and, accordingly, tangent to the equipotential at O. At the same time, the $y$ axis must necessarily extend in the direction of the gradient vector G and, accordingly, the second expression in Figure 3 giving the gradient with respect to the $y$ direction will express the magnitude of the gradient subject to the approximation previously mentioned. It may be noted that when this condition is achieved there is no necessity for any pair of the electrodes lying on the same equipotential; in fact, that condition would not occur except for the trivial case of equipotentials taking the form of concentric circles through the region under investigation. The value of the magnitude of the gradient is, furthermore, not expressed merely as an average of the difference of potential between two electrodes.

Theoretical considerations will reveal that the results expressed in Figure 3 are accurate to the extent of neglect of terms of seventh and higher degree in a power expression for the value of the potential at the origin O. In most practical cases which are encountered, the error is negligible unless the value of $a$ is large. It may be noted that the expressions in Figure 3 do not include the potential at the electrode designated O. This electrode is, however, conveniently utilized for practical application as will hereafter appear.

While there has been described an arrangement of eight electrodes equally spaced about the circumference of a circle centered at the origin for which measurements are to be made, any desired number of equally spaced electrodes may be similarly utilized and the expressions in Figure 4 are the general ones for the $x$ and $y$ components of the gradients when $n$ electrodes are used, the radius of the circle being indicated by $a$. It will be evident that the special equations of Figure 3 are derived from the general expressions in Figure 4. The derivation of the expressions in Figure 4 need not be given but it may be remarked that they follow from the properties of two-dimensional potentials mentioned above and from formulae well-known in the theory of practical Fourier analysis.

It may be remarked that by suitable combinations of the electrode potentials other derivatives of the potential field may be measured approximately, e. g. rates of change of gradients with respect to the coordinate directions, etc.

Before proceeding to a description of the applicability of the invention to a reservoir analyzer such as that of the Yetter application, it may be pointed out that if measurement alone is involved there is no necessity, for the purpose of securing the magnitude and direction of the gradient, to provide for rotation of the electrode assembly. It will be evident from the expressions in Figures 3 and 4 that given the rectangular components of the gradient, the magnitude and direction of the gradient immediately follow. The magnitude is, of course, the square root of the sum of the squares of the gradient components, while the tangent of the angle between the gradient and the $x$ axis is given by the ratio of the $y$ and $x$ components of the gradient. It is, accordingly, to be considered that within the scope of the invention is the utilization of an electrode array of one of the types herein described without the necessity for rotation of the array and without the necessity for electrical combination of the measured potentials which might, instead, be merely measured so that from them the gradient components, and ultimately, the gradient magnitudes and directions may be calculated.

The application of the invention to a complete reservoir analyzer will be made clear from reference to Figures 5 and 6 which are, to a major extent, reproductions of Figures 10 and 11, respectively, of said Yetter application, similar reference numerals being used. It is unnecessary in the present case to describe details of the reservoir analyzer of said Yetter application, and reference may be made thereto for details, but Figures 5 and 6 will show the fashion in which the electrode configurations of the present case are tied in with the elements of said analyzer.

Referring first to Figure 5, it will be noted that the electrodes 1 and 5 of the configuration illustrated in Figure 2 are connected to the primary terminals of a transformer 10, while the electrodes 2, 4, 6 and 8 are connected to the primary terminals of transformers 12 and 12' to give potential difference pairs as will be evident from the first expression in Figure 3. The secondary terminals of transformer 10 are connected between ground and the grid of a triode 14, while the secondary terminals of transformers 12 and 12' are connected in series between ground and the grid of a triode 16. The triodes 14 and 16 are connected as cathode followers through the potentiometers 18 and 20 to negative potential terminals. Adjustable contacts of these potentiometers are connected through equal condensers 22 and 24 and equal resistances 26 and 28 to the input of an amplifier 30.

It will be evident that these connections, with suitable relationships of the transformer terminals and settings of the contacts of potentiometers 18 and 20 will provide at the junction of resistances 26 and 28 as an input to the amplifier 30 a potential which will be proportional to the value of the $x$ component of the gradient given by the first expression in Figure 3. It may be assumed that the electrode configuration is to be rotated to give a zero value of this input. Comparing the disclosure of said Yetter application, a corresponding zero input was to be secured by rotation of an electrode configuration and instead of feeding to a transformer 274 the difference of potential of a pair of electrodes as in said Yetter application, the output of the amplifier 30 is fed to an equivalent transformer designated 274. As in said Yetter application, the potential of the center electrode 0 is fed to the grid of a triode 256. From the points of application of these potentials, the diagram in Figure 5 is identical with that of Figure 10 of said Yetter application.

A transformer 249 supplies current to a potentiometer 252 having a manually adjustable contact 254. A pair of cathode followers, including triodes 256 and 258, are respectively fed from the potential electrode 0 and the contact 254 and provide an input corresponding to the difference of potentials of these two inputs through lines 260 to the primary of a transformer 264 the secondary of which feeds a meter 266 the readings of which will correspond to the difference of potential existing between probe O and contact 254. The meter is used as a null indicator of equality of potential of contact 254 with that of probe O, whereupon the potential of the probe may be read from a calibrated scale on potentiometer 252.

For automatic operation, it is required that the probe O should assume a position at which its potential has a definite value corresponding to that set by the contact 254 on potentiometer 252. The difference of potential from the cathode followers is accordingly fed through switch 262 to the primary of a transformer 268 which, in association with the transformer 272 and resistances 270 connected between the secondaries of these transformers, provides a bridge arrangement.

The transformer 274 supplies an input to cathode followers comprising the triodes 276 and 278, the differential output of these followers being delivered through lines 280 to the primary of transformer 272.

The output from the bridge arrangement including the resistances 270 is delivered from the electrical centers of the resistance array to the control grids of a pair of pentodes 296 and 298 constituting, along with the triodes 215 and 217, a two-stage amplifier. The output from the anodes of the triodes 215 and 217 is delivered to the cathodes of diodes 219 and 221 the anodes of which are connected together and through connection 223 to the centertaps of the secondaries of transformers 268 and 272. The arrangement thus provided constitutes an automatic gain control which operates in conventional fashion to suppress the amplification of strong signals and provide maximum amplification of weak signals.

Outputs from the anode circuits of triodes 215 and 217 are fed to an amplifier 225 which controls reversible operation of a motor 52 which, as disclosed in detail in said Yetter application, effects rotation of the probes.

Considering the operations involved in automatic following of an equipotential in the tank of the model, with the switch 262 closed, it will be noted that the input supplied to the bridge comprising the resistances 270 are two-fold: an input through transformer 268 corresponds to the difference of potential between the center potential probe O and the contact 254; while an input through transformer 272 corresponds to the difference of potential applied across the primary of the transformer 274. If the former input were missing, the signal representing the difference of potential across the input to transformer 274 would supply an output from amplifier 225 which would drive the motor 52 in such direction as to reduce the input to zero. The combined signals, however, cause a probe setting which through the corresponding setting of the steering motor 157 of the driver produces movement toward the chosen equipotential which is to be reached by the center probe O. When that equipotential is reached, the signal representing the difference of potential between the probe O and contact 254 will disappear, and the probes will be aligned to give a zero value for the $x$ component of the gradient at the position of probe O. Through the potentiometers 68, 126 and 181, energized through the switches 208, 210, 211, 218 and 220, as described in said Yetter application, from the transformer 206 and by virtue of the connections of their respective contacts 70, 128 and 183 to the motors 52, 120 and 157 automatic control of movements of model, plotter and driven units are provided. Figure 5 also shows the manually adjustable potentiometer 222 energized by closure of switches 228 and 230 and a manual steering control involving potentiometer 290 having a manually adjustable contact 288 and energized by transformer 292, but such elements have no direct relationship with the present invention and reference may be made to said Yetter application for their purposes and operation.

Referring now to Figure 6 which corresponds to Figure 11 of said Yetter application, there are illustrated input terminals 32 and 34 for the transformer 227. The primary of the transformer 227 may be fed with an input corresponding precisely to that of the input to transformer 274 of Figure 5 with the exception that the inputs to the transformers corresponding to 10, 12 and 12′ would be from the electrodes 2, 3, 4, 6, 7 and 8, the potentials of which are involved in the second expression in Figure 3. It will be evident from the preceding discussion that when the probes are aligned to give a zero signal at transformer 274, the signal input to the transformer 227 will be the $y$ component of the gradient given by the second xpression in Figure 3 which will be the actual gradient in view of the zero value for the $x$ component. Comparing what has been described in said Yetter application with the present arrangement, this means that the approximate gradient input to the transformber 227 in said application will be replaced by the more accurate gradient value provided from the probes just listed.

The secondary of the transformer 227 is connected to an adjustable resistance network indicated at 229 including a pair of ganged potentiometers, providing an input to the cathode follows including the triodes 231 and 233. A condenser 241 compensates for minor phase shifts in the circuit. The differential output from the cathodes of these cathode followers is delivered through lines 235 to the double-pole double-throw switch 237. In the right-hand position of this switch it may be connected through another double-pole double-throw switch 239 to the primary of a transformer 245 which is associated with another transformer 263 in a bridge-type network including the resistances 265. Alternatively, the primary of transformer 245 may be connected through switch 239 to the fixed and movable contacts of a potentiometer 251 which is energized through transformer 253. The contact 251 is manually adjustable and serves for manual control of the speed of motor 159.

The generator 161 which is driven by motor 159 is connected through a phase-shifting network 255 and a transformer to the inputs of a pair of cathode followers comprising the triodes 257 and 259 in conventional circuits. The output from the cathodes of these triodes is delivered through lines 261 to the primary of a transformer 263. This output is also delivered to the coil indicated at 326′ which functions as described in said Yetter application.

The output from the bridge arrangement of resistors 265 is fed to a pair of amplifiers indicated at 267 and 269 to a motor-driving amplifier 271 which serves to drive the motor 159.

The general operation of the portion of Figure 6 so far described may now be indicated. With the switches 237 and 239 in the illustrated positions, the bridge has two inputs, one corresponding to the potential gradient and the other corresponding to the output voltage of the generator 161. The generator 161 is of induction type having a pair of field coils one of which is energized from the common alternating current source while the other provides the output. A generator of this type has the characteristic that the output voltage is directly proportional to speed. The two signals delivered to the bridge provide an output which measures their difference and serves to control the speed of motor 159 so that the output voltage signal from generator 161 balances the gradient signal. The result, then, is that the motor 159 rotates at a speed directly proportional to the gradient potential and, consequently, a carriage described in said Yetter application is driven at a speed proportional to the gradient.

Continuing the description of Figure 6, the switch 237 in its left-hand position provides a signal proportional to the gradient through lines 273 to a pair of contacts of a double-pole triple-throw switch 275. The movable members of switch 275 have another position in which they are both grounded. In a third position one of them is grounded and the other is connected to one end of a resistance 297 the other end of which is grounded. The ungrounded end of this resistance 297 is connected to a switch 295 to a point 293 of a resistance network, the switch 295 being controlled by a clock so as to be closed periodically at equal suitable intervals of time to provide markings. The movable members of the switch 275 are connected to the primary of transformer 277 which, together with the transformer 285, is connected into a resistance bridge having resistances 287. A transformer 299 energized from the alternating current source supplies a resistance network which includes a rheostat 279 and a potentiometer 281 having a movable contact 283 for zero adjustment. The point 293 previously referred to is provided by a junction of two resistors which shunt the potentiometer 281. Also shunting this potentiometer is a resistance wire 146 the movable contact 144 of which is connected to the stylus carrier as described in said Yetter application. The signal appearing between contacts 144 and 283 is fed to the primary of the transformer 285. The output from the bridge is delivered through an amplifier 289 to the amplifier 291 which reversibly controls a stylus motor.

A comparison of the foregoing with the disclosure of said Yetter application will show the direct applicability of the present type of electrode configurations to automatic control in a reservoir analyzer for the determination of various quantities and for the plotting of desired curves. It will be appreciated, as indicated heretofore, that the invention is of considerably more general applicability, and it is therefore to be understood that it is not to be regarded as limited except as required by the following claims.

What is claimed is:

1. In combination with conducting means carrying current and providing a potential field, a probe array comprising at least six probe elements in fixed spaced relationship with each other on the circumference of a circle and arranged to pick up potentials in said field, and means receiving and combining the potentials of said probe elements to provide outputs approximately proportional to components of the gradient of said field in the vicinity of said probe array.

2. In combination with conducting means carrying current and providing a potential field, a probe array comprising at least six probe elements in fixed spaced relationship with each other and equally spaced on the circumference of a circle and arranged to pick up potentials in said field, and means receiving and combining the potentials of said probe elements to provide outputs approximately proportional to components of the gradient of said field in the vicinity of said probe array.

3. In combination with conducting means carrying current and providing a potential field, a probe array comprising at least six probe elements in fixed spaced relationship with each other on the circumference of a circle and arranged to pick up potentials in said field, means receiving and combining the potentials of said probe elements to provide outputs approximately proportional to components of the gradient of said field in the vicinity of said probe array, and means controlled by at least one of said outputs for rotating said probe array.

4. In combination with conducting means carrying current and providing a potential field, a probe array comprising at least six probe elements in fixed spaced relationship with each other and equally spaced on the circumference of a circle and arranged to pick up potentials in said field, means receiving and combining the potentials of said probe elements to provide outputs approximately proportional to components of the gradient of said field in the vicinity of said probe array, and means controlled by at least one of said outputs for rotating said probe array.

5. In combination with conducting means carrying current and providing a potential field, a probe array comprising at least six probe elements in fixed spaced relationship with each other on the circumference of a circle and arranged to pick up potentials in said field, means receiving and combining the potentials of said probe elements to provide outputs approximately proportional to components of the gradient of said field in the vicinity of said probe array, and means controlled by at least one of said outputs for rotating said probe array to a position of approximately zero value of the output aproximately proportional to one component of the gradient.

6. In combination with conducting means carrying current and providing a potential field, a probe array comprising at least six probe elements in fixed spaced relationship with each other and equally spaced on the circumference of a circle and arranged to pick up potentials in said field, means receiving and combining the potentials of said probe elements to provide outputs approximately proportional to components of the gradient of said field in the vicinity of said probe array, and means controlled by at least one of said outputs for rotating said probe array to a position of approximately zero value of the output approximately proportional to one component of the gradient.

7. In combination with conducting means carrying current and providing a potential field, a probe array comprising eight probe elements in fixed spaced relationship with each other and equally spaced on the circumference of a circle and arranged to pick up potentials in said field, and means receiving and combining the potentials of said probe elements to provide outputs approximately proportional to components of the gradient of said field in the vicinity of said probe array.

8. In combination with conducting means carrying current and providing a potential field, a probe array comprising eight probe elements in fixed spaced relationship with each other and equally spaced on the circumference of a circle and arranged to pick up potentials in said field, means receiving and combining the potentials of said probe elements to provide outputs approximately proportional to components of the gradient of said field in the vicinity of said probe array, and means controlled by at least one of said outputs for rotating said probe array.

9. In combination with conducting means carrying current and providing a potential field, a probe array comprising eight probe elements in fixed spaced relationship with each other and equally spaced on the circumference of a circle and arranged to pick up potentials in said field, means receiving and combining the potentials of said probe elements to provide outputs approximately proportional to components of the gradient of said field in the vicinity of said probe array, and means controlled by at least one of said outputs for rotating said probe array to a position of approximately zero value of the output approximately proportional to one component of the gradient.

10. In combination with conducting means carrying current and providing a potential field, a probe array comprising at least six probe elements in fixed spaced relationship with each other on the circumference of a circle and arranged to pick up potentials in said field, and means receiving and combining the potentials of said probe elements to provide outputs approximately proportional to components of a derivative of said field in the vicinity of the probe array.

11. In combination with conducting means carrying current and providing a potential field, a probe array comprising at least six probe elements in fixed spaced relationship with each other and equally spaced on the circumference of a circle and arranged to pick up potentials in said field, and means receiving and combining the potentials of said probe elements to provide outputs approximately proportional to components of a derivative of said field in the vicinity of the probe array.

References Cited in the file of this patent

UNITED STATES PATENTS

| 2,569,816 | Lee | Oct. 2, 1951 |
| 2,569,817 | Wolf et al. | Oct. 2, 1951 |
| 2,569,818 | Lee | Oct. 2, 1951 |
| 2,612,627 | Straney | Sept. 30, 1952 |

OTHER REFERENCES

Greenwood "Electronic Instruments," Fig. 6.31, McGraw-Hill Pub. Co., 1948.